United States Patent
Mixon et al.

(10) Patent No.: US 9,415,705 B2
(45) Date of Patent: *Aug. 16, 2016

(54) POWER SEAT WITH COMPLETE MANUAL WALK-IN SYSTEM

(71) Applicant: AISIN TECHNICAL CENTER OF AMERICA, INC., Plymouth, MI (US)

(72) Inventors: Michael Mixon, Plymouth, MI (US); Ryosuke Mizuno, Novi, MI (US)

(73) Assignee: AISIN TECHNICAL CENTER OF AMERICA, INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,599

(22) Filed: May 1, 2014

(65) Prior Publication Data
US 2015/0314710 A1 Nov. 5, 2015

(51) Int. Cl.
*B60N 2/12* (2006.01)
*B60N 2/06* (2006.01)
*B60N 2/07* (2006.01)
*B60N 2/22* (2006.01)

(52) U.S. Cl.
CPC .............. *B60N 2/2227* (2013.01); *B60N 2/067* (2013.01); *B60N 2/0722* (2013.01); *B60N 2/123* (2013.01)

(58) Field of Classification Search
CPC ... B60N 2/0722; B60N 2/0727; B60N 2/0732
USPC ....................................................... 297/344.1
See application file for complete search history.

(56) References Cited

U.S. PATENT DOCUMENTS

| 5,516,071 | A | 5/1996 | Miyauchi | |
|---|---|---|---|---|
| 5,727,768 | A | 3/1998 | Sakamoto | |
| 8,393,591 | B2 * | 3/2013 | Mizuno et al. | 248/424 |
| 8,967,583 | B2 * | 3/2015 | Stoia | 248/429 |
| 9,156,377 | B2 * | 10/2015 | Mixon | B60N 2/12 |
| 2004/0026974 | A1 * | 2/2004 | Severini et al. | 297/344.1 |
| 2007/0013218 | A1 * | 1/2007 | Kayumi et al. | 297/344.1 |
| 2009/0200849 | A1 | 8/2009 | Schmale | |
| 2010/0026070 | A1 * | 2/2010 | Rohee et al. | 297/344.1 |

(Continued)

FOREIGN PATENT DOCUMENTS

EP 0 800 952 A1 10/1997

OTHER PUBLICATIONS

Extended European Search Report issued Sep. 30, 2015 in Patent Application No. 14199243.8.

(Continued)

*Primary Examiner* — Timothy J Brindley
(74) *Attorney, Agent, or Firm* — Oblon, McClelland, Maier & Neustadt, L.L.P.

(57) ABSTRACT

A seat including a seat back, a walk-in lever that releases the seat back so that the seat back may rotate, a slide mechanism having an upper rail and lower rail, a connection device between the seat back and a slide mechanism that releases the slide mechanism, a lock lever that rotates in response to rotation of the seat back, and a lock lever that rotates in response to rotation of the seat back. The seat configured so that rotation of the seat back in a forward direction by a predetermined amount releases the slide mechanism so that the seat may slide in a fore-aft direction. The slide mechanism configured so that, in the locked position, the lock lever directly contacts the lower rail such that forward force on the seat is directly transferred from the lock lever to the lower rail at the point of direct contact.

9 Claims, 6 Drawing Sheets

(56) References Cited

U.S. PATENT DOCUMENTS

| | | | |
|---|---|---|---|
| 2010/0283302 A1* | 11/2010 | Fukuda | 297/344.1 |
| 2012/0223561 A1* | 9/2012 | Hurst et al. | 297/344.1 |
| 2013/0193730 A1* | 8/2013 | Walter et al. | 297/341 |
| 2013/0278033 A1* | 10/2013 | Tame et al. | 297/344.1 |
| 2014/0183917 A1* | 7/2014 | Becker et al. | 297/344.1 |
| 2014/0232157 A1* | 8/2014 | Hoshihara et al. | 297/344.1 |
| 2014/0239690 A1* | 8/2014 | Yamada et al. | 297/344.1 |
| 2015/0130242 A1* | 5/2015 | Markel | 297/344.1 |

OTHER PUBLICATIONS

Office Action issued Nov. 9, 2015 in European Patent Application No. 14199243.8.

* cited by examiner

POWER SEAT WITH COMPLETE MANUAL WALK-IN SYSTEM

BACKGROUND OF THE INVENTION

1. Field of the Invention

Exemplary aspects of the present invention relate to a manually operated walk-in system of a powered vehicle seat.

2. Description of the Related Art

Seats of a vehicle such as an automobile may be provided with a reclining mechanism that allows the seat back to pivot at a base portion thereof. These seats may also be provided with a sliding mechanism that allows the seat to travel in the fore-aft direction of the vehicle. Both the reclining mechanism and the sliding mechanism may be operated using individual manual levers, typically located on the vehicle seat. Also the reclining mechanism and the sliding mechanism may be replaced by a powered actuator that performs the sliding and reclining functions without additional effort from the user. Seats equipped with these features are typically called power seats or power assisted seats.

Seats may also include a walk-in feature that assists the egress and ingress of the vehicle. Typically, the walk-in feature allows one to more easily enter a space behind the seat by moving the seat forward and by rotating the seatback forward. Therefore, the walk-in feature has a recliner function and/or a slide function. These walk-in functions can be powered or manually actuated.

When the walk-in function is not in use, the sliding mechanism is locked in order to prevent the seat from traveling in the fore-aft direction of the vehicle. The sliding mechanism is locked by the connection between a lock lever fixed to the vehicle and a lead screw nut fixed to the seat. In some designs, interdigitated teeth are used to connect the lock lever to the lead screw. In the interdigitated teeth designs, recesses in the lead screw nut correspond to raised teeth from the lock lever, whereby the teeth of the lock lever occupy the recesses in the lead screw nut and prevent motion in the fore-aft direction. If the teeth are retracted from the recesses in the lead screw nut, then motion in the fore-aft direction is allowed. U.S. Pat. No. 5,516,071 illustrates a conventional walk-in mechanism.

One challenge with the interdigitated teeth design is that during a crash, extreme force on the teeth may cause the teeth bend resulting in the failure of the lock and the seat sliding the fore-aft direction. A second challenge is that the interdigitated teeth design occupies significant space due to the way in which the lock lever teeth are retracted from the recesses in the lead screw nut.

SUMMARY OF THE INVENTION

A seat including a seat back, a walk-in lever that releases the seat back so that the seat back may rotate, a slide mechanism having an upper rail and lower rail, a connection device between the seat back and a slide mechanism that releases the slide mechanism, a lock lever that rotates in response to rotation of the seat back, and a lock lever that rotates in response to rotation of the seat back. The lock lever is configured to be in direct contact with the lower rail such that forward force on the seat is transferred directly from the lock lever to the lower rail at the point of contact between the lock lever and the lower rail.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
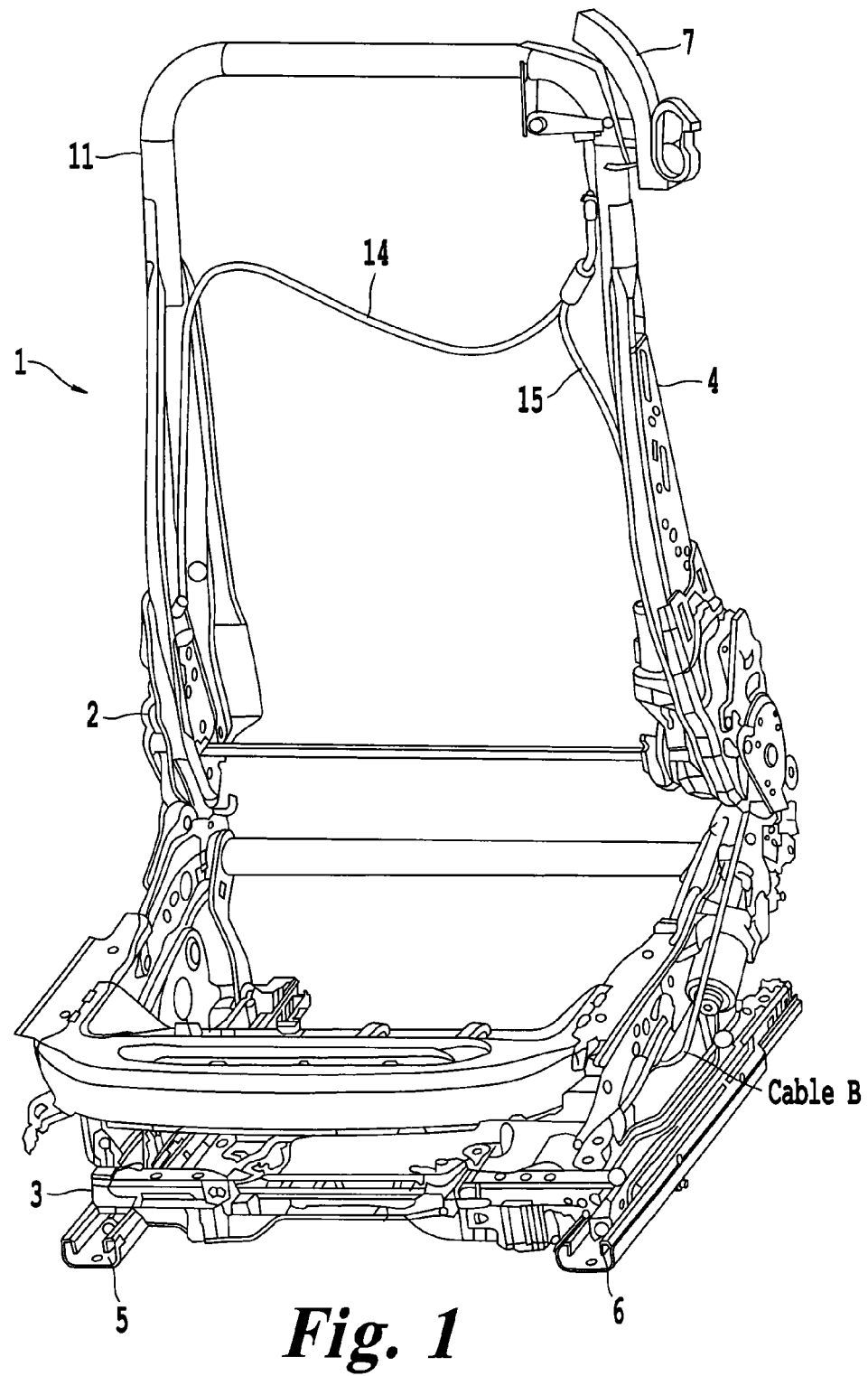
FIG. 1 is a view of an embodiment of the present disclosure.

Referring now to the drawings, wherein like reference numerals designate identical or corresponding parts throughout the several views. Further, as used herein, the words "a," "an" and the like generally carry a meaning of "one or more," unless stated otherwise.

The figures depict various aspects of a power seat with a manual walk-in feature. (also referred to as a quick walk-in). Here a vehicle refers to a land vehicle exemplified by an automobile. However, the present disclosure is also applicable to any similar type vehicle, such as but not limited to, a sport utility vehicle, a pickup truck, a commercial vehicle, a boat an airplane or the like.

FIG. 1 illustrates a seat 1 including a frame 11 provided with power recliners 2 on each side of the seat 1 and a power seat slide 3 located at the bottom of the frame 11. The power recliners 2 rotate the seat back in around an axis in a generally fore-aft direction. The power seat slide 3 moves the seat in the fore-aft direction by sliding the seat 1 on the respective inner rail 5 and outer rail 6. Both the inner rail 5 and the outer rail 6 are lower rails.

FIG. 1 also illustrates a walk-in lever 7 found at a top portion of the seat frame 11. The walk-in lever 7 here is illustrated in a shoulder area of the seat 1. Cable A, which has a first leg 14 and a second leg 15, is attached to the walk-in lever 7. When the handle 8 is operated, the cable A is moved in response. Cable A is an example of a connection device, but other means such as a linkage, lever, chain, or the like may also be used.

The respective legs 14 and 15 of Cable A extend to the inner and outer power recliners 2. The legs 14 and 15 of the cable A are arranged so that the operation of the walk-in lever 7 will effect actuation simultaneously at each of the inner and outer power recliners 2.

When the cable A is pulled a sufficient amount by the walk-in lever 7, the power recliner 2 releases its manual walk-in system. Thereafter, the seat back 4 is able to rotate forward to operate a walk-in procedure. A spring bias is provided which urges the seat back 4 forward once the manual walk-in system is released by the movement of the cable A.

As the seat back 4 rotates forward after the manual recline walk-in is released, Cable B is arranged so that the forward rotation of the seat back 4 causes cable B to move in response. At one end cable B is connected to a wire clamp 17 that is connected to a lock lever 18. Cable B is an example of a connection device, but other means such as a linkage, lever, chain, or the like may also be used.

Figure 2:
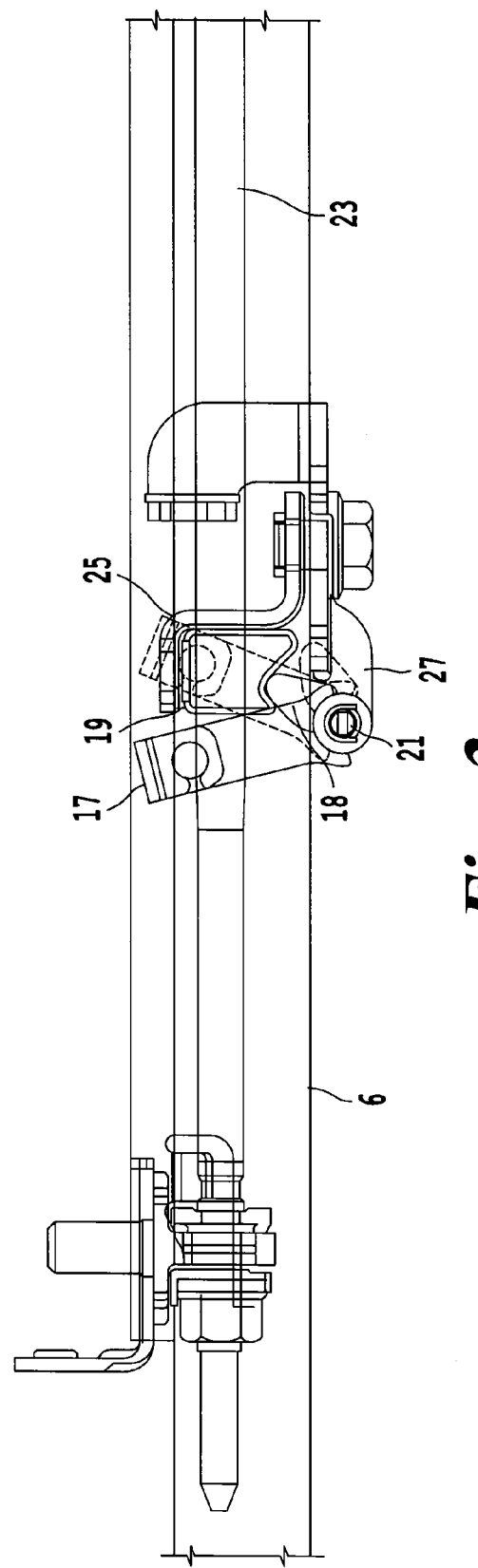
FIG. 2 is a view of an embodiment of the present disclosure.
Figure 4:
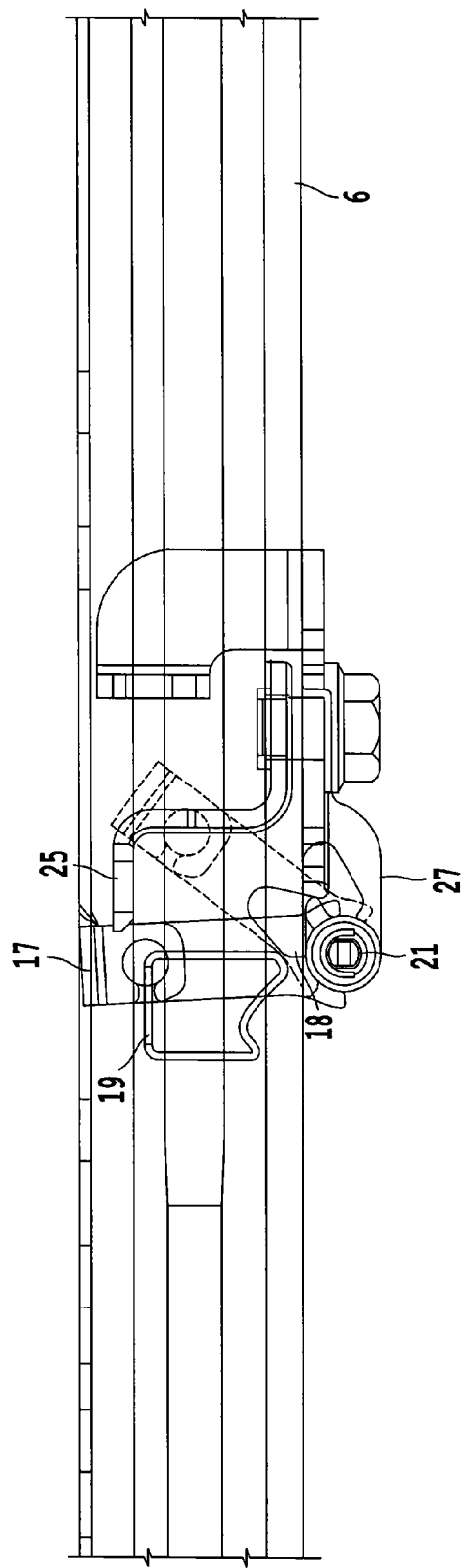
FIG. 4 is a view of an embodiment of the present disclosure.

Movement of the cable B pulls the wire clamp 17 rightward as shown in FIG. 2. As shown in FIG. 4, the movement of the lock lever 18 and the wire clamp 17 is shown in a dashed line. When the movement of the cable B moves the wire clamp 17 rightward, the lock lever 18 rotates downward. If the wire clamp 17 is moved a sufficient distance, then the lock lever 18 rotates down and out of contact with the lead screw nut 19, thereby allowing the seat track to move forward.

Figure 6:
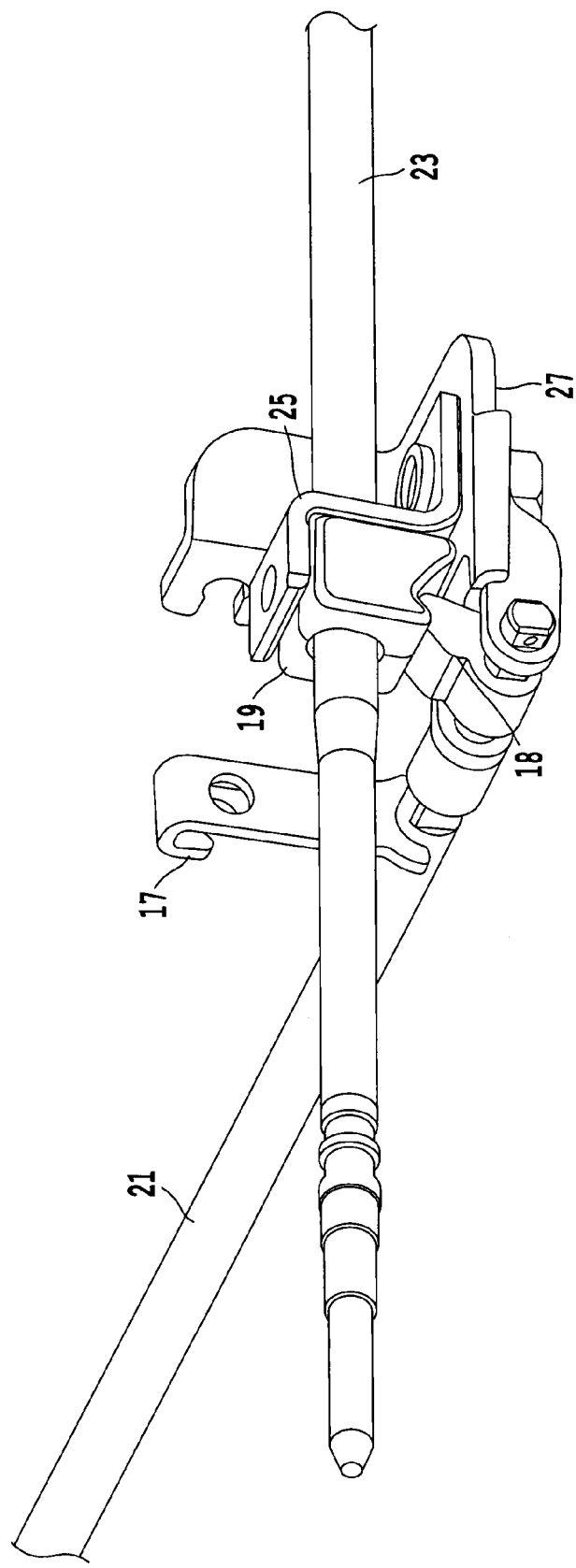
FIG. 6 is a view of an embodiment of the present disclosure.

Shown in the figures, the lead screw nut 19 is provided a lead screw 23, the nut including a through-hole through which the lead screw 23 penetrates. The lead screw nut includes a recess on a bottom portion thereof, the recess interacting with an edge of the lock lever 18. This recess can be seen for example in FIG. 2 and orthogonally at FIG. 6. The lead screw nut also contacts a bracket 25 which is connected to outer rail 26. The bracket 25 restricts the lead screw nut from moving rearward along the lead screw 23.

The lock lever 18 includes a cam surface at a first end, this cam surface interacting with the lead screw nut 19. The lock lever 18 includes a through-hole at a second end, which allows the lock lever 18 to rotate around a rail that penetrates the through-hole, the rail extending from connecting rod 21. The lock lever 18 is able to rotate around this rail so that the cam surface can engage and disengage with the recess of the lead screw nut 19.

Figure 3:
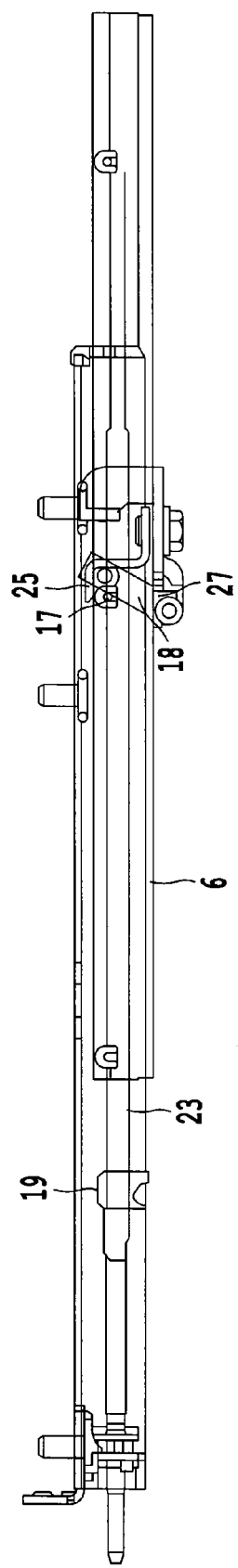
FIG. 3 is a view of an embodiment of the present disclosure.

FIG. 3 illustrates the movement of the seat track in the forward direction after the lock lever 18 releases the lead screw nut 19. The lower rail, where the lead screw nut 19 slides, is flat with no caulking pins which allows the track to slide to a forward most position.

With the seat 1 at its forward most slide position and the seat back 4 rotated to its forward most position, the walk-in operation is completed. The reverse of the walk-in will be now described.

Movement of the seat back 4 rearward causes the reverse of the movement described above. In particular, the movement of the seat back 4 rearward causes the cable B wire pull lever 16 to move in the opposite direction. This causes the cable B to move leftward toward the original position shown in FIG. 2. As the seat back 4 approaches a neutral upright position the lock lever 18 returns to the locked position due to a bias force.

FIG. 4 illustrates the track sliding rearward and the lead screw nut 19 is approaching the lock lever 18. In FIG. 4, from the neutral position, the lock lever 18 can pivot in the clockwise direction, but is prevented from rotating in the counterclockwise direction due to the presence of the outer rail 6. As the lead screw nut 19 slides over the lock lever 18, the lock lever 18 rotates in a counterclockwise direction allowing the lead screw nut 19 to pass over the lock lever 18, should the lock lever 18 be in the locked position due to the movement of the seat back 4. Here, the lead screw nut 19 would force the lock lever 18 down and counterclockwise temporarily against a biasing force that holds the lock lever 18 up in the locked position. Once the lead screw nut 19 has cleared the lock lever 18, the lock lever 18 would return to the locked position and secure the lead screw nut 19. Once the lead screw nut 19 is locked by the lock lever 18 and the seat back 4 is in the neutral upright position, then the return walk-in procedure is complete.

The rotating lock lever 18 has several advantages over alternative designs. First, the rotating lock lever design has a low profile under the rail allowing for improved packaging. That is, a distance in the vertical direction below the lower rail is reduced compared to a conventional arrangement. Second, the rotating lock lever design has greater strength than alternative designs because it transfers the load of a forward force directly to the lower rail, as shown in FIG. 5.

Figure 5:
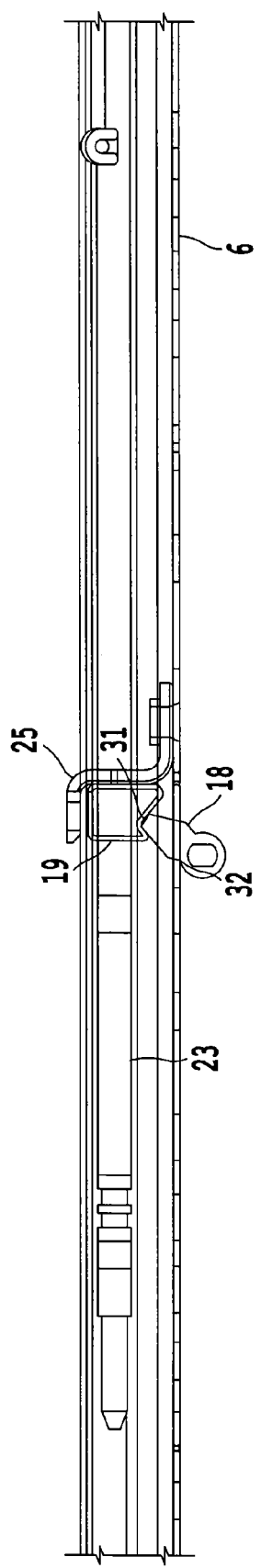
FIG. 5 is a view of an embodiment of the present disclosure.

When the lock lever is in the locked position and force is applied to move the seat toward the forward position, the interface between the lock lever 18 and the lead screw nut 19 at a first contact point 31, shown in FIG. 5, will prevent motion of the seat in the forward direction. This first contact point 31 is formed by the cam surface of the lock lever 18 and the recess of the lead screw nut 19. The forward force will be transferred through the lead screw nut 19 to the lock lever 18 at the first contact point 31. The forward force will then be transferred through the lock lever 18 directly to the outer rail 6 at a second contact point 32. Shown, for example in FIG. 6, the lock lever 18 is connected by a rail to bracket 27 attached to or part of the outer rail 6. Because the forward force is transferred directly to the outer rail 6 at the second contact point 32, this lock lever is a high strength design than alternative designs with interdigitated teeth thus reducing risk of failure of the lock lever during a crash.

The above walk-in procedure was described with regard to a single lock lever 18 and lead screw nut 19. Both the inner and outer seat tracks (5 and 6) may have the same components including lock levers and lead screw nuts. A connecting rod 21, shown in FIG. 5, is provided between the respective sides so that the movement of one side also actuates the opposite side. FIG. 5 provides a view of the one of the assemblies and the connecting rod 21.

When the lock lever is in the locked position, a force pushing the seat in the fore direction is resisted by the normal force at the second contact point 32 between the lock lever and the lead screw nut. This force is transferred to the lower rail either indirectly through the connecting rod to the lower bracket and into the lower rail or directly at the first contact point 31 between the lock lever and the lower rail. For the lead screw, the vertical component of the normal force is transferred to the upper bracket.

Accordingly, the mechanism described in detail above can provide a quick, manual walk-in system for a power seat with a powered slide and recliner function. During the walk-in the seat is able to slide to a forward-most position giving entry to the rear seat as large as possible. The mechanism uses a single manual walk-in lever to release the recliner and then both seat tracks at the same time.

Obviously, numerous modifications and variations of the present invention are possible in light of the above teachings. It is therefore to be understood that within the scope of the appended claims, the invention may be practiced otherwise than as specifically described herein.

The invention claimed is:
1. A seat comprising:
   a seat back;
   a walk-in lever that releases the seat back so that the seat back may rotate;
   a slide mechanism having an upper rail and lower rail, whereby the seat moves in the fore-aft direction due to motion of the upper rail relative to the lower rail;
   a connection device between the seat back and the slide mechanism that releases the slide mechanism;
   a lock lever that rotates in response to rotation of the seat back via the connection device; and
   a lead screw nut including a recess on a bottom portion of the lead screw nut and the lock lever engages with the recess to lock the lead screw nut,
   wherein rotation of the seat back by a predetermined amount disengages the lock lever from the lead screw nut to release the slide mechanism so that the seat may slide in a fore-aft direction.
2. The seat of claim 1, wherein in a locked position the lock lever directly contacts the lower rail such that force on the seat in the forward direction is directly transferred from the lock lever to the lower rail through the direct contact between the lock lever and the lower rail.

3. The seat of claim 1, further comprising:
a clamp device rotated by the connection device,
wherein the lock lever integrally rotates with the clamp device.

4. The seat of claim 1, wherein the lock lever includes a cam surface and the cam surface engages the recess of the lead screw nut.

5. The seat of claim 3, further comprising:
a seat bottom that slides by the slide mechanism,
wherein the lock lever and the clamp device are mounted toward the seat bottom.

6. The seat of claim 1, wherein the lead screw nut includes a hole through which a lead screw penetrates.

7. The seat of claim 1, wherein the recess has a V-shape.

8. The seat of claim 3, wherein the lock lever and the clamp device are connected by a by a rod, the lock lever and clamp device rotating around and axis of the rod.

9. The seat of claim 3, wherein the connection device is connected to the clamp device and movement of the connection device rotates the clamp device and the lock lever to engage and disengage the lock lever and the recess of the lead screw nut.

* * * * *